United States Patent
Perlin

(10) Patent No.: US 8,111,261 B1
(45) Date of Patent: Feb. 7, 2012

(54) METHOD AND APPARATUS FOR NOISE

(76) Inventor: Kenneth Perlin, New York, NY (US)

(*) Notice: Subject to any disclaimer, the term of this patent is extended or adjusted under 35 U.S.C. 154(b) by 0 days.

(21) Appl. No.: 09/718,008

(22) Filed: Nov. 21, 2000

Related U.S. Application Data

(60) Provisional application No. 60/166,932, filed on Nov. 22, 1999.

(51) Int. Cl.
*G09G 5/00* (2006.01)
(52) U.S. Cl. ........ 345/581; 345/582; 345/418; 345/419; 345/619; 345/629; 345/473; 345/474
(58) Field of Classification Search .................. 345/581, 345/582, 418–427, 619, 629, 473–474
See application file for complete search history.

(56) References Cited

U.S. PATENT DOCUMENTS 5,889,526 A * 3/1999 Hashimoto .................... 345/582

OTHER PUBLICATIONS

Ken Perlin, "An Image Synthesizer", 1985 ACM 0-89791-166-0/85/007/0287, pp. 287-296.*
Andy G. Ye and David M. Lewis, "Procedural Texture Mapping on FPGAs", ACM 1999 1-58113-088-0/99/02, pp. 112-120.*
J. P. Lewis, "Algorithms for Solid Noise Synthesis", 1989, ACM-0-89791-312-4/89/007/0263, pp. 263-270.*
B. Ramakrishna Rau, "Pseudo-Randomly Interleaved Memory", 1991 ACM 0-89791-394-9/91/0005/0074, pp. 74-83.*
Ebert, D. et al., Jul. 1998, "Texturing and Modeling; A Procedural Approach", Second Edition. AP Professional, Cambridge, pp. 209-274 (hereinafter Ebert et al.).*
Ken Perlin, "Improving noise", ACM Transactions on Graphics (TOG), v.21 n. 3, Jul. 2002, pp. 681-682.*

* cited by examiner

*Primary Examiner* — Jin-Cheng Wang
(74) *Attorney, Agent, or Firm* — Ansel M. Schwartz

(57) ABSTRACT

A method for creating an appearance of texture in a computer image having the steps of introducing information into a computer from which the image is produced for each point of the image in 3D geometric space. There is the step of computing a pseudo-random hash value at each vertex of a unit cube surrounding the point of the image using six + modules and seven L modules where the L module is implement as a look-up table having 64 6 bits entries. There is the step of mapping the lower six bits from last stage L modules of a plurality of stages of modules to a fixed set of 64 gradient vectors where the set is chosen such that a length of each component of every vector of the 64 vectors is a power of two. There is the step of based on the gradient vectors, combining with the computer the contribution from each vertex into a single interpolated result to produce the point of the image with noise interpolated texture that do not have visible grid artifacts. There is the step of after all points of the image are obtained, displaying the image on a display.

4 Claims, 3 Drawing Sheets

METHOD AND APPARATUS FOR NOISE

This application claims the benefit of U.S. provisional application No. 60/166,932 filed on Nov. 22, 1999.

FIELD OF THE INVENTION

The present invention is related to creating an appearance of texture in a computer image. More specifically, the present invention is related to creating an appearance of texture in a computer image via N bit quantities, where $N \geq 8$ and is an integer.

BACKGROUND OF THE INVENTION

The present invention describes improvements to the Perlin Noise function. These improvements: (i) improve the appearance of Perlin Noise, greatly reducing artifacts that were present in the original version, and (ii) allow for an efficient implementation at gate-level hardware, thereby facilitating performance improvement by a factor of 1000 over the software implementation now in common use.

Perlin Noise as originally described in Perlin, K., *An Image Synthesizer*, Computer Graphics; Vol. 19 No. 3, incorporated by reference herein, contained noticeable visual artifacts due to the simple way that gradients were chosen and blended. These artifacts are specifically removed by the present invention.

Also, without the improvements described in the present invention, a gate-level implementation of Perlin Noise would be prohibitively expensive and impractical, requiring many tens of thousands of gates and a throughput of only one evaluation per many clock cycles. With the improvements disclosed in present invention, Perlin Noise can be implemented in under 10000 hardware gates, with an optimal throughput of one evaluation per clock cycle.

Perlin Noise (Perlin, K., *An Image Synthesizer*, Computer Graphics; Vol. 19 No. 3, incorporated by reference herein), developed by the present inventor, is a method for synthesizing a coherent band-limited noise signal over an n dimensional geometric space $R^n$. Because Perlin Noise is repeatable, approximately isotropic, pseudo-random and band-limited, it can be used to synthesize signals with desired mixtures of spatial frequency. Because the resulting synthesized textures are very customizable and look naturalistic, Perlin Noise has proven to be a versatile tool for a number of synthesis applications.

The theoretical foundation for Perlin Noise, described by Perlin, K., *Synthesizing Realistic Textures through the Composition of Perceptually Motivated Functions*, Ph.D. Dissertation, New York University, 1986, incorporated by reference herein, is grounded in the fact that human perception is quite sensitive to spatial frequency ("*Vision: a computational investigation into the human representation and processing of visual information*", Marr, D., W.H. Freeman, San Francisco, Calif., 1982, incorporated by reference herein). That is, humans can readily distinguish items within the visual field based on scale. Perlin Noise implements a signal which has three properties: (i) It is pseudo-random—its value is uncorrelated between any two domain points which are greater than a unit distance from each other. (ii) It is approximately isotropic—statistically the same in all directions. (iii) It is band limited—most of its energy is confined to a single octave of the frequency spectrum.

This combination of features gives a tool to programmer/artists who wish to create the appearance of textures, that is highly controllable. Differently scaled instances of the Perlin Noise function can simply be summed together or combined through functional composition with simple analytic functions.

The original implementation of Perlin Noise is a pseudo-random spline over $R^n$. Given an input point, the original algorithm retrieves a pseudo-random gradient vector at each of the $2^n$ vertices of the integer-valued hypercube that surrounds the point. Then these gradient vectors are combined by cubic interpolation to produce a value for that input point.

This algorithm only approximates the properties enumerated above. In particular, because the lattice point indices are mapped to gradient directions in a uniformly random way, nothing prevents adjoining lattice points from being mapped to very similar gradient directions. Where this occurs, an unwanted visual correlation appears in the vicinity of those lattice points.

In addition, the signal produced is only approximately isotropic. Because the pseudo-random gradients are chosen uniformly in direction, the appearance of the final signal is noticeably different along the major coordinate axes, along which lattice points are spaced more closely together, than it is in off-axis directions, where the distance between successive lattice points is larger.

Furthermore, a single evaluation of Perlin Noise required a fairly large number of multiplies. Most of these multiplies are necessitated by the need to perform a vector inner product between the gradient vector at each of $2^n$ lattice points, and the difference vector from each of those lattice points to the input point. This alone requires $n2^n$ multiplies, in addition to the $2^n - 1$ multiplies required for the n dimensional spline interpolation. The large number of multiplies required to effect these inner products precludes a practical port of the original Perlin Noise algorithm to the gate-array hardware level.

Currently, the most prevalent use of Perlin Noise is in the synthesis of natural-appearing materials for computer graphics, in which case it is generally used over $R^3$. In this context, Perlin Noise has been an integral part of the computer graphics rendering portion of all commercial 3D software packages for the last ten years. Some of these commercial packages are RenderMan, Alias, SoftImage, Caligari, Kai's Power Tools, and Dynamation. A broad range of texture effects have been developed based on Perlin Noise, many of which are described in *Texturing and Modeling; A Procedural Approach*, Second Edition; Ebert D. et al, AP Professional; Cambridge 1998, incorporated by reference herein. These texture effects are now used widely in the field of visual simulation, particularly for special effects in motion pictures and television commercials. Because of this wide use, the inventor received a Technical Achievement award by the Academy of Motion Picture Arts and Sciences (Technical Achievement Award from the Academy of Motion Picture Arts and Sciences, "for the development of Perlin Noise, a technique used to produce natural appearing textures on computer generated surfaces for motion picture visual effects.", incorporated by reference herein).

In addition to being used within computer graphic software shaders to simulate the physical appearance of objects, Perlin Noise is also used to animate synthetic objects. For example, the synthesized trees in the motion picture Twister were animated at Industrial Light and Magic, a special effects company, by moving three dimensional Perlin Noise past the trees and using the gradient field of the noise as simulated force vectors, thereby making the trees appear to sway in the wind.

Even though it has found wide use in the field of visual simulation, the Perlin Noise function would find far wider use if it were many times faster. Because of the number of operations required to implement Perlin Noise in software, it cannot currently be used for a number of important applications.

For example, ten years ago the present inventor demonstrated the technique of space-filling textures built from Perlin Noise. These were rendered by taking many direct samples within a three dimensional volume. This technique was shown to simulate a wide variety of solid materials, including hair, fire, cloth, rock, and eroded metals (Perlin, K., and Hoffert, E., *Hypertexture*, 1989 Computer Graphics (proceedings of ACM SIGGRAPH Conference); Vol. 23 No. 3, incorporated by reference herein). Because such applications require computation at each point in a volume, the computational requirements were too great for most current commercial applications.

Also, real-time computer-simulated games do not yet employ Perlin Noise directly. This is because real-time game play requires the production of 30 to 60 highly textured images per second. Using a software implementation of Perlin Noise, this would require more computation than is currently available on personal computers. For this reason, current practice in the real-times game industry is to prerender materials generated with software shaders that use Perlin Noise, and then to use texture mapping techniques to place these on objects in the scene.

It would be highly desirable to remove this preproduction step, and instead to generate textures based on Perlin Noise directly, and in real time. This would allow game designers to reduce texture storage costs dramatically. Also, it would allow game players to move arbitrarily close to textured objects. Currently, texture-mapped objects in computer games become blurry in appearance when the simulated viewpoint approaches near enough so that the resolution of the texture-mapped image provides insufficient detail. Procedural textures based on Perlin Noise do not suffer from this deficiency, because higher spatial frequencies can always be computed to provide the needed detail, no matter how close the player moves.

Another disadvantage of stored textures is the need to create an explicit mapping from the two dimensional texture image to the three dimensional form of the simulated object. Procedural textures based on Perlin Noise do not have this deficiency, because the (X,Y,Z) coordinate of the object provides a direct index into the texture function, without requiring the use of an intermediate mapped image.

Also, if procedural textures based on Perlin Noise can be computed in real-time in computer games, then they can be used to create many dynamic effects such as clouds, fire, water, smoke, and heat shimmer, which can at best only be approximated with other methods.

All of the above-mentioned advantages to be gained from a real-time implementation of Perlin Noise are equally relevant for real-time military and medical simulators, real-time weather simulation, and the emerging field of simulation of natural materials for high definition and interactive broadcast television.

The Intel corporation has developed a version of Perlin Noise that takes advantage of the SIMD processing available on their MMX accelerator chip (Using MMX[tm] Instructions for Procedural Texture Mapping, Intel Developer Relations Group, Version 1.0, Nov. 18, 1996, http://developer.intel.com/drq/mmx/appnotes/proctex.htm, incorporated by reference herein). That implementation handles only the case of Perlin Noise over $R^2$, not over $R^3$. The distinction is important because noise over two dimensions provides only marginal advantages over texture mapping, whereas noise over three dimensions, for which hardware implementation is enabled by the present invention, provides texturing capabilities that are fundamentally unattainable through the use of traditional texture mapping approaches. In addition, the Intel/MMX implementation is not a hardware implementation per se, but rather a software implementation that takes advantage of the MMX architecture. As such, it requires 32 clock cycles per 2D evaluation, whereas the present invention requires only one clock cycle per 3D evaluation.

SUMMARY OF THE INVENTION

The present invention describes improvements to the Perlin Noise function. These improvements: (i) improve the appearance of Perlin Noise, greatly reducing artifacts that were present in the original version, and (ii) allow for an efficient implementation at gate-level hardware, thereby facilitating performance improvement by a factor of 1000 over the software implementation now in common use.

BRIEF DESCRIPTION OF THE DRAWINGS

In the accompanying drawings, the preferred embodiment of the invention and preferred methods of practicing the invention are illustrated in which.

DETAILED DESCRIPTION

Figure 4:
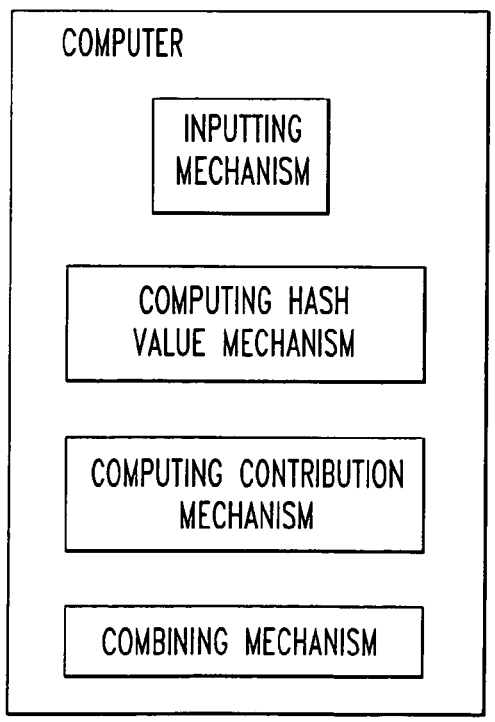
FIG. 4 is a schematic representation of the apparatus of the present invention.

Referring now to the drawings wherein like reference numerals refer to similar or identical parts throughout the several views, and more specifically to FIG. 4 thereof, there is shown an apparatus for creating an appearance of texture in a computer image. The apparatus comprises a computer. The apparatus comprises a mechanism for inputting a point (x, y, z) in three-dimensional geometric space R3 described via three 8-bit quantities i, j, k, and three 8-bit quantities u, v, w, where i, j, k are greatest integers not >x, y, z, respectively, and u, v, w signify a fractional position of x-i, y-j, z-k, respectively, in the computer. The apparatus comprises a mechanism for computing a pseudo-random hash value at each vertex of a unit cube C surrounding the point. The apparatus comprises a mechanism for computing a contribution from each vertex using the hash-value. The apparatus comprises a mechanism for combining with the computer the contribution from each vertex into a single interpolated result.

The present invention pertains to a method for creating an appearance of texture in a computer image. The method comprises the steps of inputting a point (x, y, z) in three-dimensional geometric space R3 described via three 8-bit quantities i, j, k, and three 8-bit quantities u, v, w, where i, j, k are greatest integers not >x, y, z, respectively, and u, v, w signify a fractional position of x-i, y-j, z-k, respectively, in a computer. Then there is the step of computing a pseudo-random hash value at each vertex of a unit cube C surrounding the point. Next there is the step of computing a contribution from each vertex using the hash-value. Then there is the step of combining with the computer the contribution from each vertex into a single interpolated result.

Preferably, the computing a hash value step includes computing eight five bit pseudo-random hash values hn, one hash value for each of the eight vertices of the surrounding unit cube C using six+modules and seven L modules. The computing a contribution step preferably includes computing for each vertex of the surrounding unit cube C the contribution of each vertex with three+modules and eight H modules. Preferably, the combining step includes the step of combining the contribution from each vertex into a single result using 3 ease-curve s modules.

The computing a hash value step preferably includes the step of implementing each L module as a look-up table which simultaneously retrieves 2 successive table entries, the table has n/2 rows with 2 data bits per row, where top B−1 controlled bits are used to reflect a row r, and where a lowest control bit latches between selecting entry r and r+1 for lowest b bits, and swapping lower b bits with upper b bits at a point where related data exits the table. Preferably, the computing the contribution step includes the steps of subtracting 28 from each u, v, w, computing a gradient direction from each hash value hn, performing and a inner product between the gradient direction and the associated fractional position from the associated vertex.

The computing the gradient direction preferably includes the step of mapping a lower 6 bits from a last stage of the L modules into a fixed set of gradient directions such that a length of each component of every sector is a power of 2 which allows the inner product to be done using no multiples, only adds and shifts. Preferably, the mapping step includes the step of choosing the gradients so as to be symmetrical about the principal axis, the edge diagonals and the corner diagonals of the surrounding unit cube C. The combining step preferably includes the step of using 7 linear-interrelation modules L to perform a trilinear interpolations from the eight vertices of C using the 3 ease curves as interpolants.

Preferably, the combining step includes the step of computing each ease curve in each dimension using a pre-computed entry table S sampling at intervals of $2^{-7}$ from a piecewise second order polynomial: if $(t<\frac{1}{2})$ then $(2t^2)$ else $(-2t^2+4t-1)$. The using step preferably includes the step of using the seven linear interpolations modules I, arranged into three successive stages, wherein a first stage of the three stages eight values are reduced to four various, interpolating in x; the second stage of the four values are reduced to two, interpolating in y; and the third stage, the two values are reduced to one, interpolating in z.

The physical parts consist of:
A general purpose computer
Standard enqueueing/dequeueing device driver software
A solid state electronic circuit
A data bus between the computer and the electronic circuit
A power supply The step by step operation by the user is now described. To the user, the operation is as follows:

The user software has available a device driver, which is a software library that allows the user software to place an array of data triplets, representing X,Y,Z coordinates, into an input queue. Each X,Y,Z triplet is stored as three successive 16 bit quantities in fixed point format, where for each quantity the binary value V represents the real number $2^{-8}$V. In other words, the upper byte of each quantity encodes an integer coordinate, and the lower byte of each quantity encodes a $\frac{1}{256}$ fractional part.

The device accepts one X,Y,Z triplet per clock cycle. In 1999 implementations, one clock cycle is generally 200-300 MHz. The device computes a Perlin Noise value, with a throughput of one result per clock cycle, and a latency of approximately 20 clock cycles. The device places this quantity as an 8 bit quantity onto an output queue.

The user software checks a status flag by querying the device driver. When the status is done, then the user software accesses the output queue to retrieve the result. For every 48 byte input triplet, the user software will find one 8 byte output value.

Alternatively, the user of the present invention can embed it directly into the pipeline of a larger 3D graphics chip, so that pipelined X,Y,Z coordinates are sent at regular intervals into the input gates of the present invention, and Perlin Noise values are retrieved from the output gates of the present invention in a synchronous fashion. The results can be used later in the graphics pipeline to modify color, position, texture coordinates or other shading parameters in a way that is standard in the field of computer graphics (*Computer Graphics: Principles and Practice*, C version, Foley J., et al, ADDISON-WESLEY, 1996, incorporated by reference herein).

Figure 1:
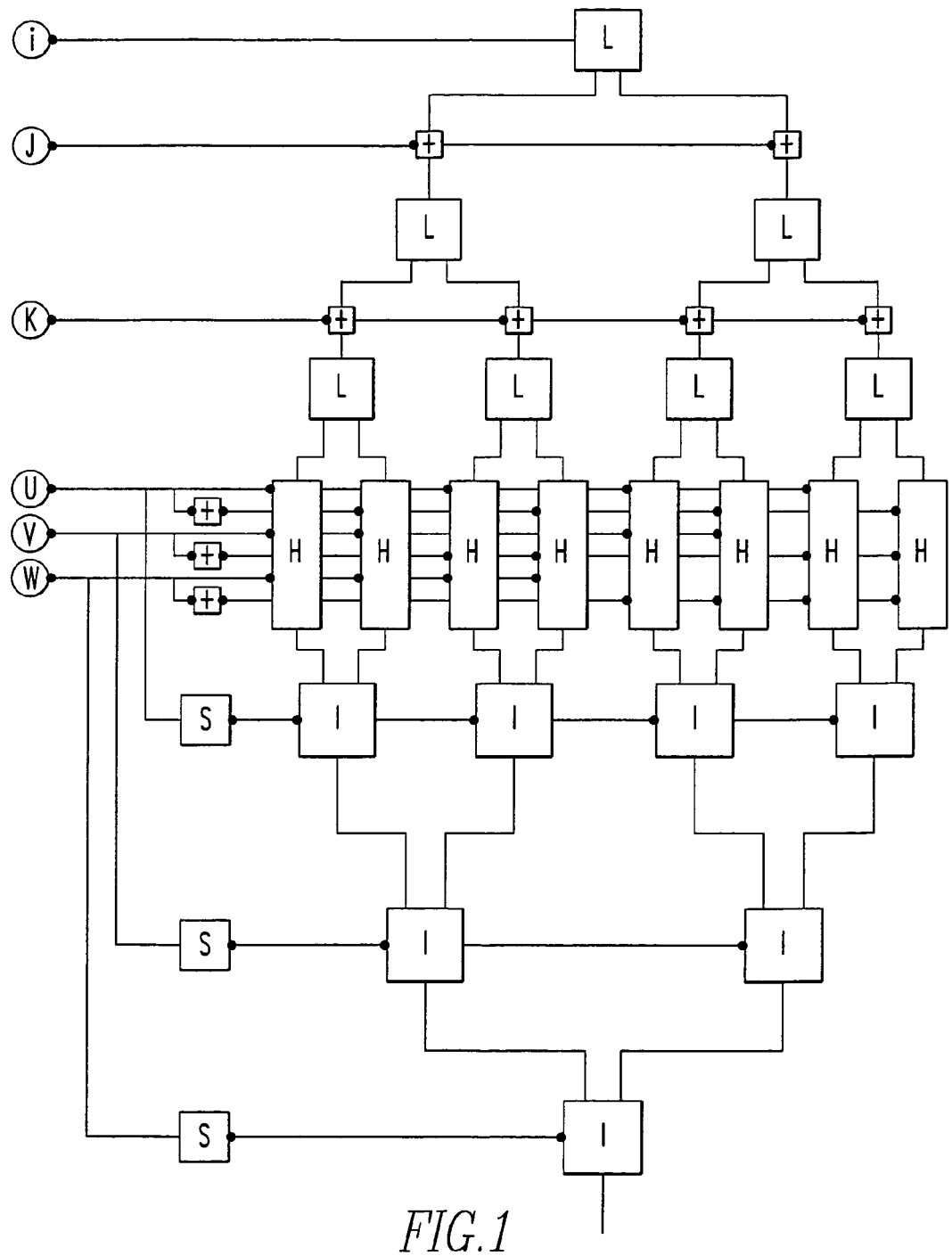
FIG. 1 is a schematic representation of the algorithm of the present invention.

The step by step internal operation in best embodiment is now described. The structure of the algorithm is as follows. The structure of the hardware implementation disclosed in the present invention is similar in outline to that of the original Perlin Noise algorithm, but the implementation of the component parts is very different. The major innovations are in the way that each component is implemented to take advantage of techniques that optimize for hardware gate-level implementation. The structure of the algorithm is shown in FIG. 1.

The input to the mechanism is a point (X,Y,Z) in $R^3$, described via six eight bit quantities i,j,k,u,v,w, where i,j,k are the greatest integers not greater than X,Y,Z, respectively, and u,v,w signify the fractional position of X,Y,Z above i,j,k, to eight bit precision. (X,Y,Z) can be defined in terms of i,j,k,u,v,w by the equation:

$$(X,Y,Z)=(i+2^{-8}u, j+2^{-8}v, k+2^{-8}w).$$

The mechanism is pipelined, so that at each new machine instruction a new value for i,j,k,u,v,w can be fed in, for a throughput of one result per clock cycle. The entire mechanism consists of three successive pipelined stages:

1. hashing
2. gradient
3. interpolation

The first hashing stage computes a pseudo-random hash value at each vertex of the unit cube C surrounding the point. These vertices are located at: (i,j,k), (i+1,j,k), (i,j+1,k), (i+1,j+1,k), (i,j,k+1), (i+1,j,k+1), (i,j+1,k+1) and (i+1,j+1,k+1), respectively. The second gradient stage uses these hash values, together with the offset of the point from each of the cube vertices, to compute the contribution from that vertex. The third interpolation stage combines these eight intermediate results into a single interpolated final result.

The First Stage—Hashing:

The first stage, consists of six '+' modules and seven L modules. In this stage, the values i,j,k are used to compute eight five bit pseudo-random hash values $h_n$, one hash value for each of the eight vertices of surrounding unit cube C.

As in Perlin, K., *An Image Synthesizer*, Computer Graphics; Vol. 19 No. 3, incorporated by reference herein, this computation steps through the coordinates, doing alternating lookups and adds: L(L(L(i)+j)+k)), where function L does a table look-up of its argument, modulo 128, into a pseudo-random table of stored values. This alternation of lookups and offsets into a pseudo-random table prevents correlations between the values returned at neighboring locations on the integer coordinate grid, which would otherwise appear as unwanted visible patterns.

Since there are 8 vertices, and three lookups are required per vertex, this would appear to require 24 table lookups, which would be quite expensive in the number of gates required. This requirement is reduced by implementing L as a lookup table which simultaneously retrieves two successive table entries.

The table is implemented as follows: Instead of an N row table with B data bits per row (in the current embodiment, N=128 and B=7 or 5), a table is laid out which has N/2 rows with 2B data bits per row. The top B−1 control bits are used to select a row r in the standard manner for a ROM implementation of a lookup table. The lowest control bit does two things: (i) Latch between selecting entry r (when the lowest control bit is clear) and r+1 (when the lowest control bit is set) for the lowest B bits. (ii) While the lowest control bit is set, swap the lower B bits with the upper B bits at the point where the selected data exits from the table.

The method disclosed requires somewhat more gates per bit of storage than is required for a simple N×B table, but far fewer than would be required to maintain two independent N×B tables.

As shown in FIG. 1, i is fed into the first L module, which produces a result for both i and i+1. Then each of these results is added to j and fed into two L modules, which produces results for (i,j), (i+1,j), (i,j+1) and (i+1,j+1). Finally, these results are added to k, and fed into four L modules, thereby producing the required eight hash values.

This innovation allows the number of tables to be reduced to only seven, thereby reducing greatly the number of gates required. Furthermore, the final four L modules are required to produce only the low order six bits, since these six bits contain the hash values needed for the second stage of the mechanism. The smaller data-width of these four final tables further reduces the number of gates required.

Decorrelating Neighboring Gradient Directions:

The above technique chooses a six bit quantity for each integer lattice point. This six bit quantity will then be used to choose a pseudo-random gradient vector. As discussed above, a uniformly random method to do this, as disclosed in the original Perlin Noise algorithm, will result in some locations where visually correlated gradients are assigned to pairs of successive lattice points. To reduce the occurrence of such correlations, the following innovation is effected. Note: In the following description N is taken to be 128, and therefore the number of bits to be $\log_2 N=7$. The method works equally well for any N which is a power of 2.

Instead of a table with 128 7 bit entries, L is implemented as a permutation table having only 64 6 bit entries. A 7 bit input value is treated as follows. If the upper input bit of the index is clear, then the high order bit of the output is set. If the upper input bit of the index is set, then the table is indexed in reverse order (i.e.: the lower six input bits are all complemented), and the high order bit of the output is cleared. In addition, the ordering of the values returned in the upper half is made distinct from the ordering in the lower half by swapping bits 0,1,2 with bits 3,4,5 in the value returned by the upper half. This requires no additional storage in the table.

The result a virtual table, in which the lower half of the entries index into the upper half of the table, and the upper half of the entries index into the lower half of the table. This produces the following desirable effects:

The size of the table is halved, thereby saving greatly in the number of gates required to implement this portion of the mechanism.

As the alternating lookups and adds progress through the coordinate dimensions, small offsets in lattice location cause a "ping-pong" effect, in which entries are alternately indexed to the lower and upper halves of the table. Because of this ping-ponging, small offsets in initial location of lattice points will cause large displacements in the final location indexed to. This produces a signal with far fewer visually correlated neighbor pairs than was produced by the original algorithm.

The Second Stage—Gradient:

The second stage consists of three '+' modules and eight H modules. This stage computes, for each vertex n of the surrounding unit cube C, the influence from that vertex on the final result.

First, the three '+' modules are used to subtract $2^8$ from each of u,v,w, to produce $U=u-2^8$, $V=v-2^8$ and $W=v-2^8$. The offsets of the input point from the eight respective vertices of C are thereby made available as: (u,v,w), (U,v,w), (u,V,w), (U,V,w), (u,v,W), (U,v,W), (u,V,W) and (U,V,W).

Each module $H_n$ then computes the contribution from vertex n of C. To do this, $H_n$ computes a gradient direction from the 5 bit hash value $h_n$ which was given to it by the first stage. It then performs an inner product between this gradient and the fractional position from vertex n. This fractional position is obtained by choosing one of u or U, one of v or V, and one of w or W.

Distribution of Gradient Vectors for the Second Stage:

One of the major expenses of the original implementation of Perlin Noise was the need to take an inner product at each of the eight bounding vertices $v_n$ of the unit cube containing the sample point p. At each v, the algorithm chose a gradient g by performing a hashing operation, and then computed the value of the linear function $f(p)=(p-v_n) \cdot g$, which has value zero at $v_n$, and maximal slope in the direction of g.

Each inner product required three multiplies, so that this step of the algorithm required a total of 24 multiplies to evaluate noise over $R^3$: three for each of the cube's eight vertices. At 8 bit precision, these multiplies would require in a hardware implementation approximately 24×750=18000 gates, assuming the standard 750 gates per 8×8 bit multiply. Because a multiply is such an expensive operation at the hardware level, one of the innovations disclosed in the current invention is a method for doing this step without any multiplies.

To do this, the current invention maps the lower six bits from the last stage L modules into a fixed set of up to $2^6=64$ gradient directions. The key innovation is to choose this set such that the length of each component of every vector is a power of two. This allows the inner product to be done using no multiplies, only adds and shifts.

The set of gradients is chosen to have three desirable properties:
1. The gradients are chosen so as to be symmetrical about the principal axes, the edge diagonals, and the corner diagonals. Distributing the gradients in this way sharply reduces the visible alias of the underlying grid in the final synthesized signal.
2. To take an inner product with any of these gradients requires no multiplies, only adds and shifts.
3. To choose from this set of $2^6$ gradients requires only production of a pseudo-random 6 bit value h, an operation well suited for hardware implementation.

In the current embodiment, the gradients are chosen from the following 64 choices:

| | |
|---|---|
| ±4, ±4, ±4 | ±4, ±4, ±4 |
| ±8, ±4, ±1 | ±8, ±1, ±4 |
| ±1, ±8, ±4 | ±4, ±8, ±1 |
| ±4, ±1, ±8 | ±1, ±4, ±8 |

Note that for reasons of directional symmetry, the gradients with magnitude 4,4,4 appear (and are therefore chosen) twice as often as the others. It is very efficient to do an inner product with one of these gradients. For example, the inner product of x,y,z with 8,4,1 is implemented by (x<<3)+(y<<2)+z. In each case, the results are normalized with a three bit right shift, so that the resulting inner product can be stored in 8 bits.

The use of this gradient set is represented in module H of FIG. 1, which is duplicated eight times in the hardware implementation (one time for each vertex of the surrounding unit cube). Given a six bit hash code, and the displacement (x,y,z) of a point relative to a cube vertex, this module performs the equivalent of an inner product, using the upper three bits of h to choose one of the eight octants, and the lower three bits of h to choose one of the eight gradients within the chosen octant. This is implemented using only two 8 bit adders and a small amount of control logic:

```
// Map hash code into one of a discrete set of directions; take inner product with (x,y,z).
// (2 adds -> 2*4 = 8 CLBs)
    static int H(int h, int x, int y, int z) {
        int b5=(h>>5)&1;, b4=(h>>4)&1;,    // GET HASHCODE BITS.
            b3=(h>>3)&1;, b2=(h>>2)&1;, b=h&3;
        if (b5 == b3 ) x = -x;              // CHOOSE WHETHER EACH COORD
        if (b5 == b4 ) y = -y;              // IS POSITIVE OR NEGATIVE
        if (b5 !=(b4^b3)) z = -z;
        int u = b==1 ? x : b==2 ? y : z,
            v = b==1 ? y : b==2 ? z : x,    // CHOOSE MAJOR AXIS.
            w = b==1 ? z : b==2 ? x : y;
        u >> = b==0 ? 1: 0;
        v >> = b==0 ? 1 : b2==0 ? 1: 3;     // RATIO OF U TO V TO W:
        w >> = b==0 ? 1 : b2==0 ? 3 : 1;    // 4,4,4 OR 8,4,1 OR 8,1,4
        return (u + v + w) >> 1;            // TWO ADDS USE MOST OF THE GATES.
}
```

If each of the upper three bits of h were simply used to assign a ± sign to each of x,y, and z, then any nonrandomness in these bits would produce an asymmetry between x,y, and z. In order to ensure no such asymmetry when choosing the octant, the highest bit of h is used to choose between the octants of even parity (−,−,−), (−,+,+), (+,−,+), (+,+,−) and the octants of odd parity (+,+,+), (+,−,−), (−,+,−), (−,−,+). The next two bits in h are then used to choose between the four octants with the given parity.

The Third Stage—Interpolation:

The third and last stage consists of three ease-curve modules, labeled S in FIG. 1, and seven linear-interpolation modules, labeled I in FIG. 1. This stage uses its three S modules, indexed respectively by u, v and w, to compute an ease curve in each dimension, and then uses its seven I modules to perform a trilinear interpolation from the eight vertices of C, using the three ease curves as interpolants.

To compute each ease curve, a precomputed 128 entry table S is used. For this ease curve, the current embodiment samples at intervals of $2^{-7}$ from the piecewise second order polynomial: if (t<½) then $(2t^2)$ else $(-2t^2+4t-1)$.

To do the trilinear interpolation, seven linear interpolator modules I are used, arranged into three successive stages. In the first stage, the eight values are reduced to four, interpolating in x. In the second stage, these four values are reduced to two, interpolating in y. In the third stage, these two values are reduced to one, interpolating in z. Each linear interpolator module I requires an 8×8 bit multiply and two adds.

Figure 2:
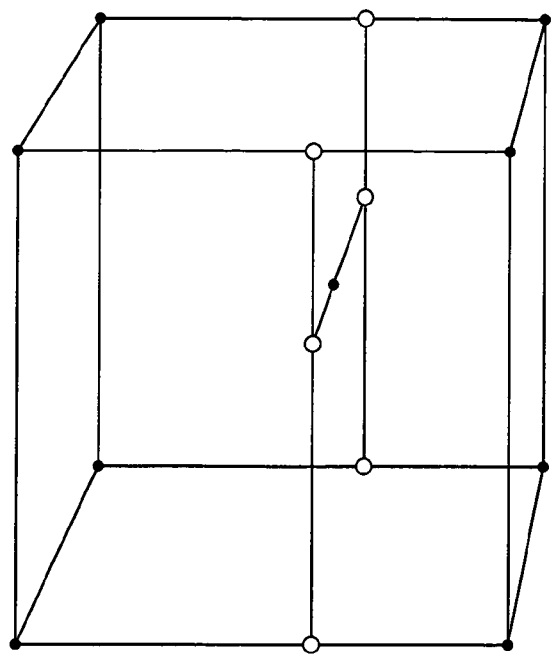
FIG. 2 is a schematic representation showing successive stages of interpolation of the present invention.

FIG. 2 shows the successive stages of this interpolation. The eight black dots at the corners of cube C represent the values returned by the eight H modules. The four white dots along the cube edges represent the results of the first stage of interpolation. The two white dots on the front and back cube face represent the results of the second stage of interpolation. The black dot within the cube represents the final computed value at X,Y,Z.

Example of the Present Invention in Use

Figure 3:
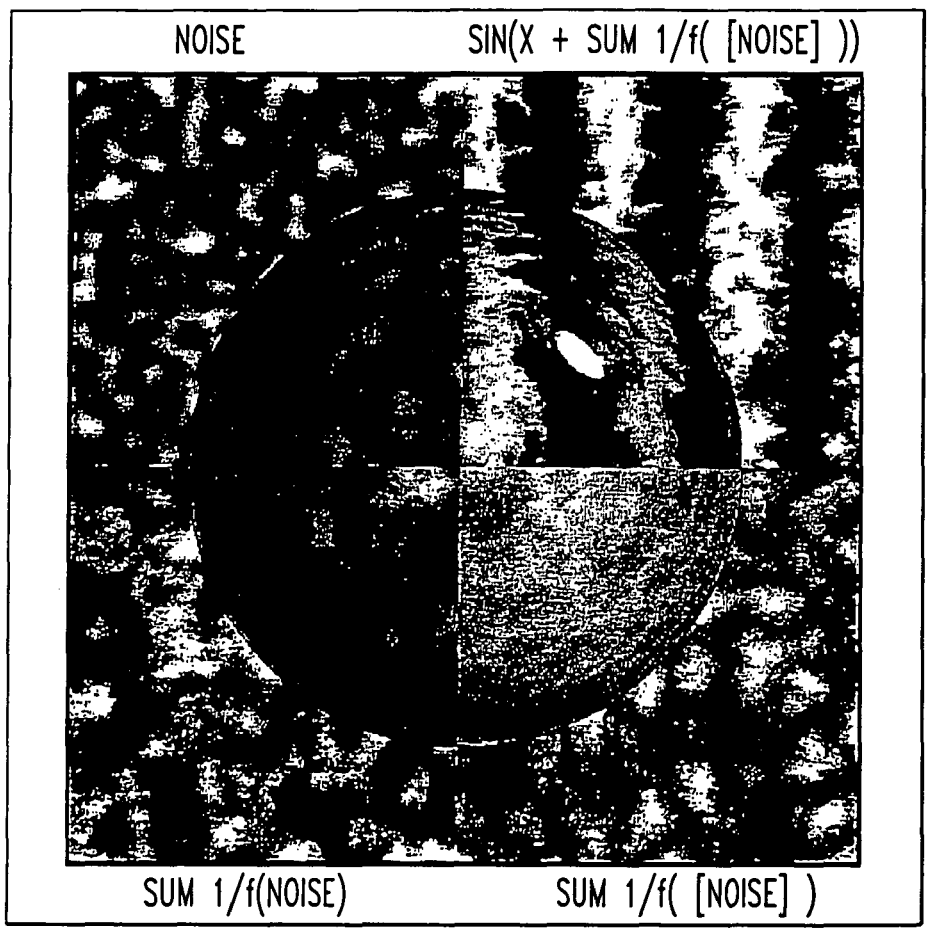
FIG. 3 shows an emulation of the present invention applied to the synthesis of artificial textures.

FIG. 3 shows an emulation of the present invention applied to the synthesis of artificial textures.

The upper left of FIG. 3 shows the evaluation of the disclosed implementation of Perlin Noise over both a plane surface and on the surface of a sphere. Note in particular the absence of gridlike artifacts or directional biases in the synthesized signal. This texture being is used to simulate a "watery" surface.

The lower left of FIG. 3 shows a pseudo-fractal sum $F_0$ of noise textures, defined by summing eight evaluations of noise, each of which is defined by $2^{-i}noise(2^i T^i(x))$, where x is a three dimensional vector, i=0, 1, 2, 3, 4, 5, 6, 7, and T is a 60 degree rotation transformation. To effect this rotation, the cosine factor or 0.5 is implemented by a right shift; the sine factor of sqrt(3)/2 is implemented by the constant-multiply and right shift combination (111*x)>>7. This texture is being used to create an impression of clouds or atmosphere.

The lower right of FIG. 3 shows a pseudo-fractal sum $F_1$ of the absolute value of noise, similar to the above but with noise replaced by |noise|. This texture is being used to create an impression of a wall of flame.

The upper right of FIG. 3 uses $F_1$ to modify the phase of a sine function over the x coordinate: $M(x)=sin(x+F_1(x))$. This texture is being used to simulate marble.

Extensions:

It is obvious from this description how to extend the invention in a number of standard ways. For example, a number of duplicates of the circuit can be included in the same chip, and executed in parallel to create the pseudo-fractal sum of noise and of the absolute value of noise which are shown above in FIG. 3. This extension can vary as to how it trades off between parallel implementation and pipelining of the different octaves of the pseudo-fractal sum, thereby trading off between effective throughput rate and the number of gates required.

In addition, it is obvious from this description how to extend the invention to higher dimensions by successive doubling of the components, since for n dimensions the mechanism is laid out in a $2^n$ element fan-out, followed by a $2^n$ element fan-in. An n dimensional implementation requires $2^n-2$ '+' modules and $2^n-1$ L modules in step one, followed by n '+' modules and $2^n$ H modules in step two, followed by n S modules and $2^n-1$ I modules in step three. For example, a four dimensional implementation requires 14 '+' modules and 15 L modules in step one, followed by 4 '+' modules and 16 H modules in step two, followed by 4 S modules and 15 I modules in step three.

Complete Software Emulation of the Invention:

The following is a functionally complete emulation of the current invention, implemented in the Java programming language. The comments describe the number of Control Logic Blocks (CLBs) required for implementation on a Field Programmable Gate Array (FPGA), which is a good indicator of the hardware complexity for an implementation on a general purpose integrated circuit.

The code below also includes an implementation of Fractal noise built on top of Perlin Noise, one variation of which is Perlin Turbulence (Perlin, K., *An Image Synthesizer*, Computer Graphics; Vol. 19 No. 3, incorporated by reference herein). The comments indicate the expense of including this in the hardware implementation.

```java
import java.util.*;
// Algorithm for gate-efficient port to hardware of my noise function - Ken Perlin.
// The comments in parens calculate the numbers of Control Logic Blocks (CLBs) required
// on an FPGA. The number of hardware gates required is roughly 10 times those figures.
public final class Pnoise {
    static int a[ ] = new int[2], b[ ][ ] = new int[2][2], c[ ][ ][ ] = new int[2][2][2],
            u[ ] = new int[2], v[ ] = new int[2] , w[ ] = new int[2];
// Gate-level-optimized implementation of 3D noise
// (7 Ls + 9 adds + 3 Ss + 8 Hs + 7 Is -> 7*16 + 9*4 + 3*20 + 8*8 + 7*78 = 818 CLBs)
    static int pnoise(int x, int y, int z) {
        int i = x>>8, j = y>>8, k = z>>8;         // INTEGER COORDS
        u[0] = x&255;
        v[0] = x&255;                              // FRACTIONAL COORDS
        w[0] = x&255;
                                                   // FIRST STAGE
        L(i, a);                                   // 1 HASHING FROM INTEGER X
        L(a[0]+j, b[0]);                           // 2 HASHINGS FROM INTEGER Y
        L(a[1]+j, b[1]);
        L(b[0][0]+k, c[0][0]);                     // 4 HASHINGS FROM INTEGER Z
        L(b[0][1]+k, c[0][1]);
        L(b[1][0]+k, c[1][0]);
        L(b[1][1]+k, c[1][1]);
                                                   // SECOND STAGE
        u[1] = u[0]-256;
        v[1] = v[0]-256;                           // COMPUTE FRACTIONAL COORDS
        w[1] = w[0]-265;                           // W.R.T. UPPER INTEGER COORDS
        for (i = 0 ; i < 2 ; i++)                  // COMPUTE THE 8 GRADIENTS
        for (j = 0 ; j < 2 ; j++)
        for (k = 0 ; k < 2 ; k++)
            c[i][j][k] = H(c[i][j][k],u[i],v[j],w[k]);
                                                   // THIRD STAGE
        int r = S[u[0] >> 1];
        int s =S[v[0] >> 1];                       // LOOK UP EASE VALUES
        int t =S[w[0] >> 1];
        b[0][0] = I(r, c[0][0][0], c[1][0][0]);    // INTERPOLATE 4 TIMES IN X
        b[1][0] = I(r, c[0][1][0], c[1][1][0]);
        b[0][1] = I(r, c[0][0][1], c[1][0][1]);
        b[1][1] = I(r, c[0][1][1], c[1][1][1]);
        a[0] = I(s, b[0][0], b[1][0]);             // INTERPOLATE 2 TIMES IN Y
        a[1] = I(s, b[0][1], b[1][1]);
        return I(t, a[0], a[1]);                   // INTERPOLATE 1 TIME IN Z
    }
// Return two successive values from a pseudo-random table
// (64x8 table -> 2*2*4 = 16 CLBs)
    static void L(int i, int[ ] a) {
        i &= 127;
        int j = i+1 & 127;
        int u = L[(i&64;)!=0 ? 127-i : i],
            v = L[(j&64;)!=0 ? 127-j : j];
        a[0] = (i&64;)!=0 ? u>>3 | ((u&7;) << 3) : u;
        a[1] = (j&64;)!=0 ? v>>3 | ((v&7;) << 3) : v;
    }
// Map hash code into one of a discrete set of directions; take inner product with (x,y,z).
// (2 adds -> 2*4 = 8 CLBs)
    static int H(int h, int x, int y, int z) {
        int b5=(h>>5)&1;, b4=(h>>4)&1;,            // GET HASHCODE BITS.
            b3=(h>>3)&1;, b2=(h>>2)&1;, b=h&3;
        if (b5 == b3 ) x = -x;                     // CHOOSE WHETHER EACH COORD
        if (b5 == b4 ) y = -y;                     // IS POSITIVE OR NEGATIVE
        if (b5 !=(b4^b3)) z = -z;
        int u = b==1 ? x : b==2 ? y : z,
            v = b==1 ? y : b==2 ? z : x,           // CHOOSE MAJOR AXIS.
            w = b==1 ? z : b==2 ? x: y;
```

```
            u >> = b==0 ? 1 : 0;
            v >> = b==0 ? 1 : b2==0 ? 1 : 3;        // RATIO OF U TO V TO W:
            w >> = b==0 ? 1 : b2==0 ? 3 : 1;        // 4,4,4 OR 8,4,1 OR 8,1,4
            return (u + v + w) >> 1;                // TWO ADDS USE MOST OF THE GATES.
        }
// Linear interpolator logic
// (1 8x8 mult + 2 adds -> 70+2*4 = 78 CLBs)
        static int I(int s, int A, int B) {return A + ((B-A)*s >> 8); }
//---- LOGIC TO GENERATE FRACTALS AND TURBULENCE, BY REPEATED CALLS TO
NOISE-----
// Fractal texture built from successive calls of 3D noise (mode sets "turbulence" option)
// (iterative: 3 adds + 2 constant mults -> 3 * 4 + 2 * 20 = 52 CLBs)
// (parallel: 7 * 52 = 364 CLBs)
        static int pfractal(int mode, int x, int y, int z) {
            int sum = 0, term = 0, u, v;
            for (int i = 0 ; i < 8 ; i ++) {
                term = pnoise(x <<i, y<<i, z<<i) >> i;
                if (mode == 1 && term < 0) term = -term;
                sum + = term;
                u = x;
                v = y;
              x = ( 111 * u >> 7) + (v >> 1);
              y = (-111 * v >> 7) + (u >> 1);
            }
            return sum;
        }
//------ CODE TO GENERATE TABLES, WHICH DOESN'T ACTUALLY APPEAR IN THE
HARDWARE -----
// Support code to build pseudo-random permutation table
// NOTE: Because it only needs to be pseudo-random (which is a weak constraint),
// this table can be compressed.
        static final int N=64;
        static int L[ ] = initL( );
        static int[ ] initL( ) {
            int L[ ] = new int[N], i, j, k;
            for (i = 0 ; i < N ; i++)
                L[i] = i;
            for (i = 0 ; i < N ; i++) {
                j = (N-1) & (int)(N * 10000 * Math.sin((i+2) * 100 * Math.sin((i+3) * 100)));
                k = L[i];
                L[i] = L[j];
                L[j] = k;
            }
            return L;
        }
// Initialize table of cubic interpolant s(t) = 3t^2 - 2t^3
// (128x8 table -> 4*2*4 = 32 CLBs)
// NOTE: Because it represents a smoothly varying function, this table
// could be arranged to be more compressed (i.e.: fewer than 320 gates)
        static int[ ] S = initS( );
        static int[ ] initS( ) {
            int[ ] S = new int[128];
            for (int r = 0 ; r < 256 ; r += 2)
S[r>>1] = (int)(256*s(r/256.));
            return S;
        }
        static double s(double t) { return t > .5 ? 2*t*(2-t)-1 : 2*t*t; }
}
// Linear interpolator logic
// (1 8x8 multi + 2 adds -> 70+2*4 = 78 CLBs)
        static int I(int s, int A, int B) {return A + ((B-A)*s >>8); }
//--- OPTIONAL HARDWARE TO CREATE FRACTAL AND TURBULENT TEXTURES ---
// Fractal texture by repeated calls to 3D noise (mode sets "turbulence" option)
// (iterative: 3 adds + 2 constant mults -> 3 * 4 + 2 * 20 = 52 CLBs)
// (parallel: 7 * 52 = 364 CLBs)
        static int pfractal(int mode, int x, int y, int z) {
            int sum = 0, term = 0, u, v;
            for (int i = 0 ; i < 8 ; i++) {
                term = pnoise(x<<i, y<<i, z<<i) >> i;
                if (mode == 1 && term < 0) term = -term; // if mode=1 then use | noise |
                sum += term;
                u = x;
                v = y;
              x = ( 111 * u >> 7) + (v >> 1);        // Rotate about z axis by 60
              y = (-111 * v >> 7) + (u >> 1);        // degrees before next step.
            }
            return sum;
        }
```

-continued

```
//-- CODE TO GENERATE TABLES. THIS CODE DOESN'T ACTUALLY APPEAR IN THE
HARDWARE --
// Support code to build pseudo-random lookup table
// NOTE: Because it only needs to be pseudo-random (a weak constraint),
// this table can be made more compressed (i.e.: fewer than 320 gates)
    static final int N=128;
    static int L[ ] = initL( );
    static int[ ] initL( ) {
        int L[ ] = new int[N+1], i, j, k;
        for (i = 0 ; i < N ; i++)
            L[i] =i;
        for (i = 0 ; i < N ; i++) {
            j = (N-1) & (int)(N * 100 * Math.sin(i * 100 * Math.sin(i * 100)));
            k = L[i];
            L[i] = L[j];
            L[j] = k;
        }
        L[N] = L[0];
        return L;
    }
// Initialize table of piecewise polynomial ease function for interpolant
// (128x8 table -> 4*2*4 = 32 CLBs)
// NOTE: Because it represents a smoothly varying function, this table
// can be arranged to be more compressed (i.e.: fewer than 320 gates)
    static int[ ] S =initS( );
    static int[ ] initS( ) {
        int[ ] S =new int[128];
        for (int r =0 ; r < 256 ; r += 2)
            S[r>>1] = (int)(256*s(r/256.));
        return S;
    }
    static double s(double t) { return t > .5 ? 2*t*(2-t)-1 : 2*t*t; }
}
```

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for creating an appearance of texture in a computer image comprising the steps of:
   introducing information into a computer from which the image is produced;
   for each point of the image in 3D geometric space:
   computing a pseudo-random hash value at each vertex of a unit cube surrounding the point of the image using six+ modules and seven L modules where the L module is implement as a look-up table having 64 6 bits entries;
   mapping the lower six bits from last stage L modules of a plurality of stages of modules to a fixed set of 64 gradient vectors where the set is chosen such that a length of each component of every vector of the 64 vectors is a power of two;
   based on the gradient vectors, combining with the computer the contribution from each vertex into a single interpolated result to produce the point of the image with noise interpolated texture that do not have visible grid artifacts; and
   after all points of the image are obtained, displaying the image on a display.

2. The method of claim 1 wherein the producing step includes the step of producing the images with texture in real time.

3. The method of claim 1 wherein the producing step includes the step of producing the images with texture based on pseudo-fractal sum.

4. The method of claim 1 wherein the producing step includes the step of producing the images with texture based on a sine function.

* * * * *